United States Patent
Chong et al.

(10) Patent No.: US 10,151,892 B2
(45) Date of Patent: Dec. 11, 2018

(54) METHOD TO BOND TWO SURFACES WITH PRECURED EPOXY AND OPTICAL SUBASSEMBLY INCLUDING THE SAME

(71) Applicant: Finisar Corporation, Sunnyvale, CA (US)

(72) Inventors: Kam Meng Chong, Ipoh (MY); Chiew Loon Siew, George Town (MY); Yih Pin Wong, Menglembu (MY); Chee Wai Soong, Gopeng (MY); Sarah Idayu Binti Zainal Arifin, Chemor (MY); Aziema Binti Mohamad Azizi, Ulu Kinta (MY); Shashipal Singh Dalbir Singh, Chemor (MY)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/494,236

(22) Filed: Apr. 21, 2017

(65) Prior Publication Data

US 2017/0307835 A1  Oct. 26, 2017

Related U.S. Application Data

(60) Provisional application No. 62/326,491, filed on Apr. 22, 2016.

(51) Int. Cl.
*G02B 6/42* (2006.01)
*B29C 65/48* (2006.01)
*B32B 7/12* (2006.01)
*B29L 11/00* (2006.01)

(52) U.S. Cl.
CPC ........ *G02B 6/4239* (2013.01); *B29C 65/4805* (2013.01); *B32B 7/12* (2013.01); *G02B 6/4256* (2013.01); *B29L 2011/00* (2013.01)

(58) Field of Classification Search
USPC ........................................... 428/414
See application file for complete search history.

(56) References Cited

U.S. PATENT DOCUMENTS

2014/0147677 A1*  5/2014  Lutz ................... C08G 59/4021
                                                              428/416

FOREIGN PATENT DOCUMENTS

JP        H107991 A       1/1998
WO    2008115513 A1    9/2008

OTHER PUBLICATIONS

International Search Report and Written Opinion, as issued in connection with International Patent Application No. PCT/US2017/029216, dated Jul. 27, 2017, 9 pgs.

* cited by examiner

*Primary Examiner* — Terressa Boykin
(74) *Attorney, Agent, or Firm* — Maschoff Brennan

(57) ABSTRACT

In an example, a method may include dispensing a portion of epoxy on a first surface. The method may also include curing the portion of epoxy to form precured epoxy. The method may also include positioning the first surface and a second surface separated from each other by a gap. The precured epoxy is located within the gap between the first surface and the second surface. The method may also include dispensing bulk epoxy into the gap and in contact with the precured epoxy, the first surface, and the second surface. The method may also include curing the bulk epoxy to bond the first surface to the second surface.

19 Claims, 5 Drawing Sheets

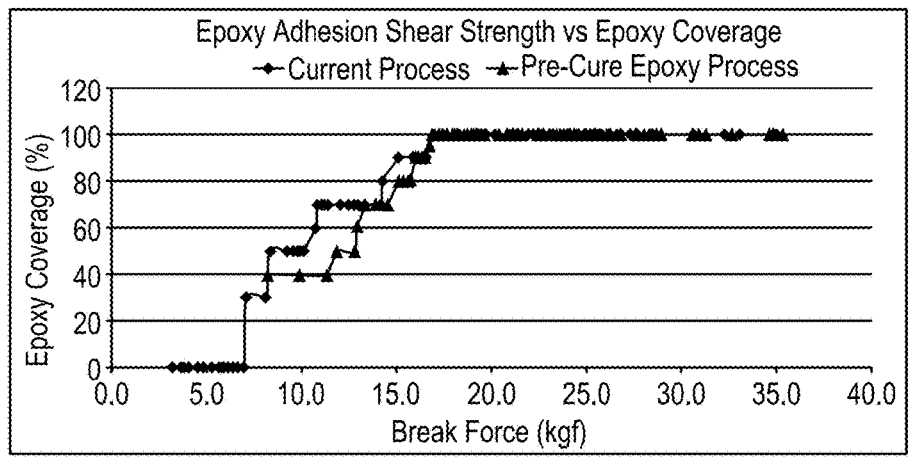
FIG. 7
| Epoxy Coverage (%) | Standard Process | | Pre-Cure Epoxy Process | |
|---|---|---|---|---|
| | Quantity | % | Quantity | % |
| 0 | 21 | 21% | - | - |
| 1-19 | - | - | - | - |
| 20-39 | 4 | 4% | - | - |
| 40-59 | 6 | 26% | 6 | 6% |
| 60-79 | 13 | 13% | 6 | 6% |
| 80-99 | 4 | 4% | 13 | 13% |
| 100 | 52 | 52% | 75 | 75% |
| Total | 100 | 100% | 100 | 100% |
FIG. 8
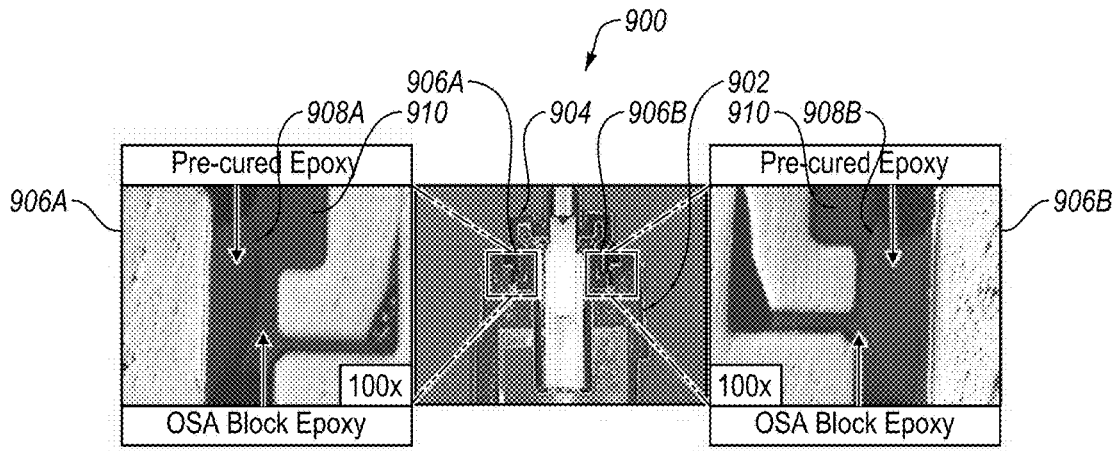
FIG. 9

METHOD TO BOND TWO SURFACES WITH PRECURED EPOXY AND OPTICAL SUBASSEMBLY INCLUDING THE SAME

CROSS-REFERENCE TO RELATED APPLICATIONS

This application claims the benefit of and priority to U.S. Provisional App. No. 62/326,491, filed Apr. 22, 2016. The foregoing provisional application is incorporated herein by reference.

FIELD

Some embodiments discussed herein are related to precured epoxy that may be implemented in optoelectronic communication modules and/or in other environments to bond surfaces.

BACKGROUND

Unless otherwise indicated herein, the materials described herein are not prior art to the claims in the present application and are not admitted to be prior art by inclusion in this section.

Optoelectronic communication modules, such as transceivers or transponders, may include an optical subassembly (OSA) block and an OSA receptacle. The OSA block and the OSA receptacle are designed to be coupled together. An optical fiber is configured to be repeatedly inserted to and removed from the OSA receptacle. Thus it is important to strengthen the bond between the OSA block and the OSA receptacle in order to avoid an unexpected separation between them.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to a method to bond a first surface to a second surface with precured epoxy and/or to an OSA including precured epoxy.

In an example embodiment, a method may include dispensing a portion of epoxy on the first surface. The method may also include curing the portion of epoxy to form precured epoxy. The method may also include positioning the first surface and the second surface separated from each other by a gap. The precured epoxy is located within the gap between the first surface and the second surface. The method may also include dispensing bulk epoxy into the gap and in contact with the precured epoxy, the first surface, and the second surface. The method may also include curing the bulk epoxy to bond the first surface to the second surface.

In another example embodiment, an OSA may include a first surface. The OSA may also include a second surface separated from the first surface by a gap. The OSA may also include precured epoxy dispensed on the first surface and located within the gap. The OSA may also include bulk epoxy dispensed into the gap and in contact with the precured epoxy, the first surface, and the second surface. The precured epoxy is formed by dispensing and curing a portion of epoxy on the first surface before the bulk epoxy is dispensed and cured into the gap.

In another example embodiment, a method may include dispensing a first portion of epoxy on the first surface. The method may also include curing the first portion of epoxy to form first precured epoxy. The method may also include dispensing a second portion of epoxy on the first surface. The method may also include curing the second portion of epoxy to form second precured epoxy. The method may also include dispensing a third portion of epoxy on the first surface. The method may also include curing the third portion of epoxy to form third precured epoxy. The method may also include dispensing a fourth portion of epoxy on the first surface. The method may also include curing the fourth portion of epoxy to form fourth precured epoxy. The method may also include positioning the first surface and the second surface separated from each other by a gap. The first precured epoxy, the second precured epoxy, the third precured epoxy, and the fourth precured epoxy are located within the gap between the first surface and the second surface. The method may also include dispensing bulk epoxy into the gap and in contact with the first precured epoxy, the second precured epoxy, the third precured epoxy, the fourth precured epoxy, the first surface, and the second surface. The method may also include curing the bulk epoxy to bond the first surface to the second surface.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIG. 7 is a graph illustrating relationships between epoxy adhesion shear strength and measured epoxy coverage, of various units assembled using a standard epoxy application process and of various units assembled using an example precured epoxy application process;

FIG. 8 is a table with a distribution, in terms of epoxy adhesion shear strength and measured epoxy coverage, of the various units of FIG. 7;

FIG. 9 illustrates a cross-sectional view of an example OSA block and OSA receptacle assembled using an example precured epoxy application process, all arranged in accordance with at least one embodiment described herein.

DETAILED DESCRIPTION OF SOME EXAMPLE EMBODIMENTS

Some embodiments described herein relate to precured epoxy that may be implemented in optoelectronic communication modules and/or in other environments to improve epoxy bond shear strength between two components coupled together by epoxy. Alternatively or additionally, some embodiments described herein may be applied to non-epoxy adhesives.

Technologies described herein may be applicable in high-speed fiber optics transceivers, silicon photonics devices, and other suitable products.

Reference will now be made to the drawings to describe various aspects of some example embodiments of the disclosure. The drawings are diagrammatic and schematic representations of such example embodiments, and are not limiting of the present disclosure, nor are they necessarily drawn to scale.

Figure 1:
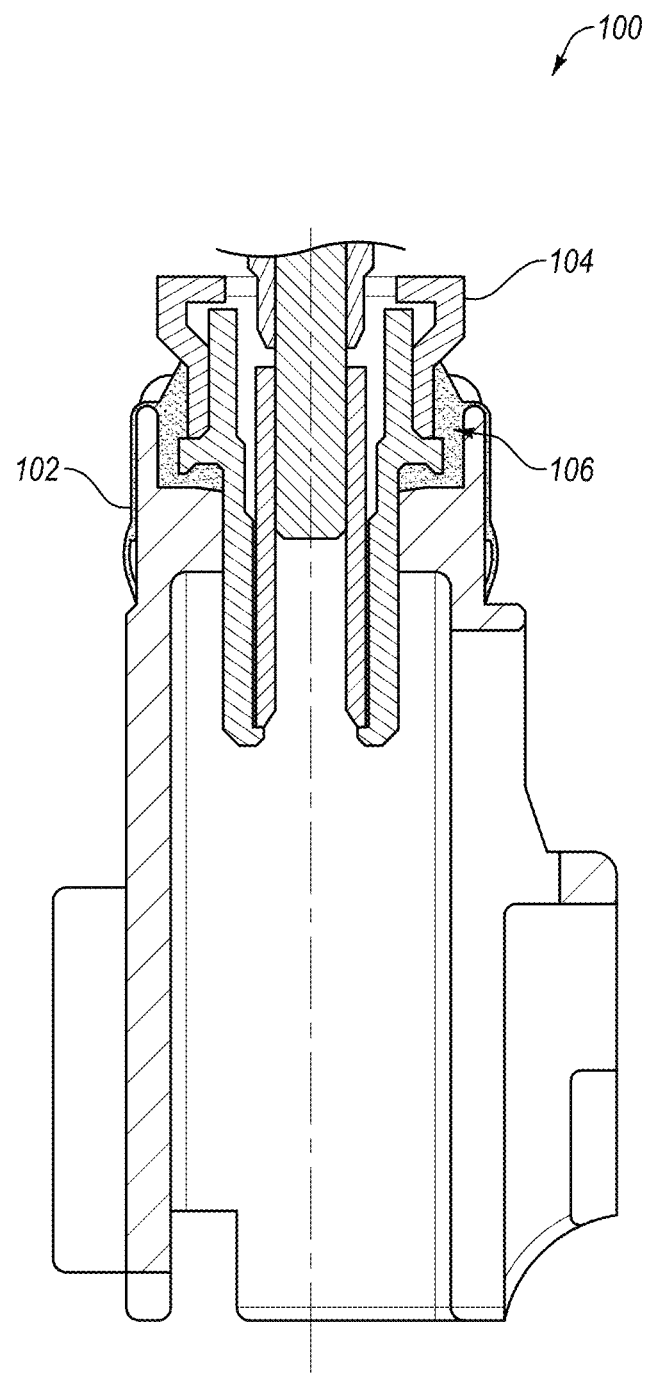
FIG. 1 illustrates an example environment in which precured epoxy may be implemented.

FIG. 1 illustrates an example environment 100 in which precured epoxy may be implemented, arranged in accordance with at least one embodiment described herein. The environment 100 includes an optical subassembly (OSA) block 102, an OSA receptacle 104, and epoxy 106, all shown in cross section. The OSA block 102 and the OSA receptacle 104 may be manufactured as separate components that may be coupled together by the epoxy 106 as described herein during assembly of an optoelectronic communication module that includes the OSA block 102 and the OSA receptacle 104.

The optoelectronic communication module may be a transceiver or transponder module. The optoelectronic communication module may conform in some embodiments to a particular form-factor. Many form-factors have been or are in the process of being defined in industry Multi-Source Agreements ("MSAs"). Example MSAs and/or other form-factor specifications within which some embodiments described herein may be implemented include the Small Form-factor Pluggable ("SFP") MSA, the 10 Form-factor Pluggable ("XFP") MSA, the SFP plus ("SFP+") MSA, the Improved Pluggable Form-factor ("IPF") MSA, the Quad SFP ("QSFP") MSA, the 100 Form-factor Pluggable ("CFP") MSA (for both 40 G and 100 G applications), 100G LR4, 100G LR4 Gen2, 100G CFP2, 100G CFP4, 100G QSFP28, and 40G CFP LR4. Each MSA or form-factor specification may typically specify, among other things, the mechanical form-factor, electrical interface—including high-speed interface for data signals, low speed interface for hardware and/or firmware, and power supply—and thermal interface of the optoelectronic module and the corresponding host device receptacle. The embodiments described herein may be implemented in optoelectronic communication modules that conform to any or none of the foregoing.

Returning to FIG. 1, and as illustrated, the epoxy 106 fills a gap between the OSA block 102 and the OSA receptacle 104. During assembly, the OSA receptacle 104 may be positioned relative to the OSA block 102 as illustrated in FIG. 1 and the epoxy 106 may be dispensed into the gap between the OSA block 102 and the OSA receptacle 104, followed by curing of the epoxy 106 to bond the OSA block 102 and the OSA receptacle 104 together. In practice, it may be difficult to fill the gap with sufficient epoxy 106 to form a suitably strong bond between the OSA block 102 and the OSA receptacle 104 to keep the OSA block 102 and the OSA receptacle 104 coupled together under repeated insertion/removal of an optical fiber to/from the OSA receptacle 104. Some embodiments described herein relate to an epoxy application process that may improve a strength of the bond between the OSA block 102 and the OSA receptacle 104 and more generally between two components in environments such as the environment 100 of FIG. 1, referred to as a precured epoxy application process.

Figure 2:
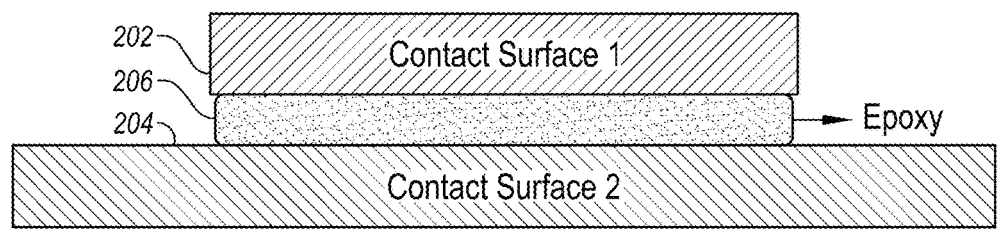
FIG. 2 illustrates an example of a first surface and a second surface that may be bonded by epoxy.

FIG. 2 illustrates an example of a first surface 202 and a second surface 204 that may be bonded by epoxy 206, arranged in accordance with at least one embodiment described herein. The first surface 202 may correspond to or include the OSA block 102 of FIG. 1, the second surface 204 may correspond to or include the OSA receptacle 104, and the epoxy 206 may correspond to or include the epoxy 106.

Epoxy bond shear strength F between the first surface 202 and the second surface 204 may depend on one or more of the following factors:

Epoxy volume or the coverage to the contact surface, referred to hereinafter as epoxy coverage a.

Epoxy curing profile and degree of curing, referred to hereinafter as epoxy curing b.

Contact surface roughness, referred to hereinafter as contact surface roughness c.

Contact surface cleanliness, referred to hereinafter as contact surface cleanliness d.

In some embodiments, epoxy bond shear strength F can be calculated according to equation 1:

$$F = abcd \times W \quad \text{(equation 1)}$$

In equation 1, W may include empirical epoxy shear strength per manufacturer design. Epoxy bond shear strength F in practice may always be less than ideal and may depend on the epoxy application process.

The epoxy coverage a and the epoxy curing b may be determined by an epoxy application process efficiency and may commonly be less than 100%. The contact surface roughness c and the contact surface cleanliness d may have variation from batch to batch and may be considered to be variable. The epoxy curing b may be characterized during an epoxy qualification process and may be considered to be constant. Accordingly, the epoxy coverage a may be considered a control variable for some epoxy application processes.

In the environment 100 of FIG. 1 and/or in other environments, some epoxy application processes may include one or more additional limitations, such as (1) limited contact surface, (2) absence of structure support on either surface to act as a hinge or hook to the epoxy, and (3) epoxy has to enter a relatively narrow gap or tunnel in which flow of epoxy into and/or through the narrow gap or tunnel may be limited by viscosity of the epoxy.

Figure 3:
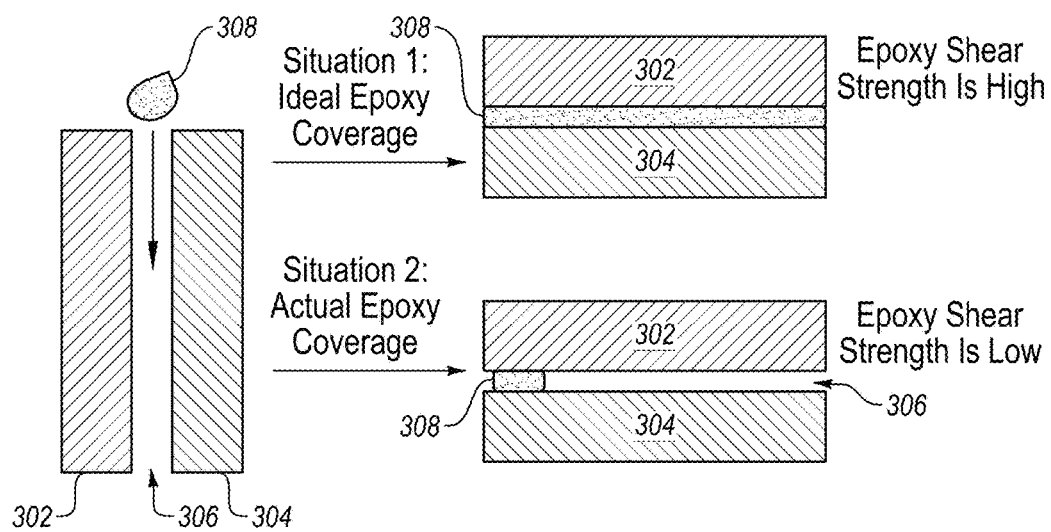
FIG. 3 illustrates an example problem that may arise in an example epoxy application process.

FIG. 3 illustrates an example problem that may arise under the foregoing limitations in an example epoxy application process, arranged in accordance with at least one embodiment described herein. In FIG. 3, a first surface 302 to be epoxy bonded to a second surface 304 is separated from the second surface 304 by a relatively narrow gap or tunnel 306 (hereinafter "gap 306"). As used herein, "relatively narrow" means that a viscosity of an epoxy 308 to be dispensed into the gap 306 to bond the first and second surfaces 302 and 304 together may make it difficult for the epoxy 308 to penetrate all the way into the gap 306.

FIG. 3 additionally illustrates two situations, labeled "Situation 1" and "Situation 2." In situation 1, the epoxy 308 fills all or most of the gap 306, resulting in a relatively high epoxy bond shear strength F between the first surface 302 and the second surface 304. Situation 1 illustrates ideal epoxy coverage. Embodiments of the precured epoxy application process described herein may result in the ideal epoxy coverage or close to the ideal epoxy coverage.

In situation 2, the epoxy 308 fills only a relatively small portion of the gap 306, resulting in a relatively low epoxy bond shear strength F between the first surface 302 and the second surface 304. Situation 2 illustrates an example of the epoxy coverage a that commonly arises in practice under the limitations (1)-(3) listed above when epoxy is dispensed in a single step between the first surface 302 and the second surface 304 (referred to as "standard epoxy application process"). Situation 2 may often lead to failure where, e.g., the OSA block 102 detaches from the OSA receptacle 104 of FIG. 1 due to insufficient epoxy coverage. Embodiments described herein improve epoxy coverage a and epoxy bond shear strength F using the precured epoxy application process mentioned previously, in which one or more portions (e.g., drops or dots) of epoxy are dispensed on a first surface and cured before dispensing bulk epoxy between the first surface and a second surface after which the bulk epoxy is then also cured. Dispensing bulk epoxy may include dispensing a relatively large volume of epoxy into the gap or tunnel between the first and second surfaces, e.g., sufficient epoxy to provide epoxy coverage a of 40% or higher between the first and second surfaces.

Figure 4:
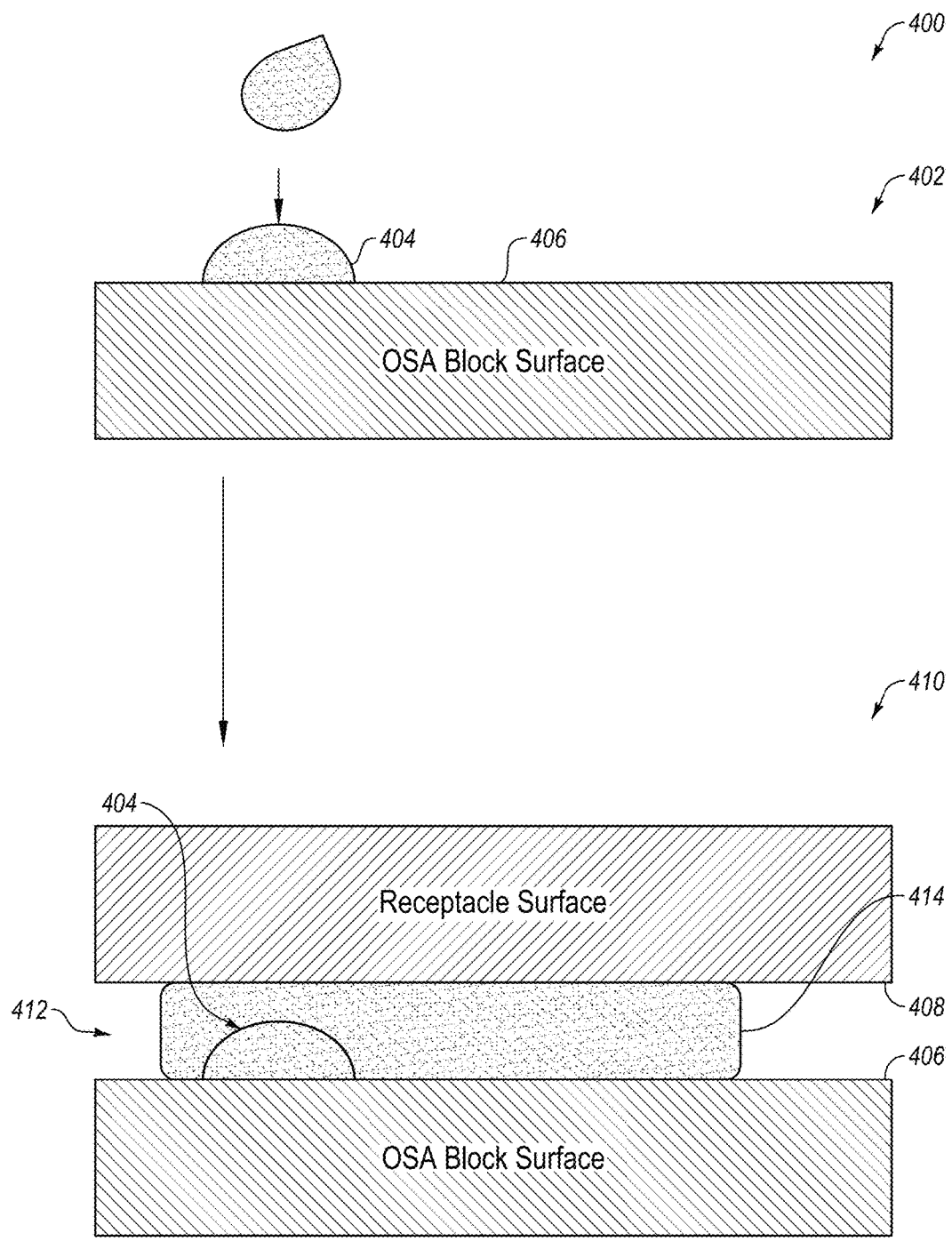
FIG. 4 illustrates an example precured epoxy application process to address the problem illustrated in and described with respect to FIG. 3.

FIG. 4 illustrates an example precured epoxy application process 400 (hereinafter "process 400") to address the problem illustrated in and described with respect to FIG. 3, arranged in accordance with at least one embodiment described herein. As generally depicted at 402 in FIG. 4, the process 400 may include dispensing a portion 404 of epoxy on a first surface 406 that later is to be epoxy bonded to a second surface 408. The first surface 406 may include or correspond to the OSA block 102 of FIG. 1 and the second surface 408 may include or correspond to the OSA receptacle 104 of FIG. 1, or vice versa.

The portion 404 of epoxy dispensed on the first surface 406 may include one drop of epoxy, two drops of epoxy, or some other relatively small volume of epoxy. One or more other portions 404 of epoxy may be dispensed on the first surface 406 at one or more other locations of the first surface 406. For instance, where the first surface 406 includes an inner cylindrical wall surface of an OSA block and the second surface 408 includes an outer cylindrical wall surface of an OSA receptacle that is at least partially positioned within a cylindrical cavity defined by the inner cylindrical wall surface of the OSA block, four portions 404 of epoxy may be dispensed on the first surface 406 at different locations, e.g., angularly spaced around the cylindrical inner wall surface.

The portion 404 of epoxy and/or other portions 404 of epoxy may then be cured. The cured portions 404 of epoxy may hereinafter be referred to as "precured epoxy 404". Where there are multiple portions 404 of epoxy dispensed on the first surface 406, the multiple portions 404 may be cured individually in series, together in parallel, or in some other manner. An example process to cure one or more portions 404 of epoxy is described with respect to FIGS. 5A-6.

As generally depicted at 410 in FIG. 4, the process 400 may additionally include positioning the first surface 406 in a desired orientation relative to the second surface 408 with a tunnel or gap 412 (hereinafter "gap 412") therebetween and dispensing bulk epoxy 414 into the gap 412 between the first surface 406 and the second surface 408, followed by curing the bulk epoxy 414 to bond the first surface 406 to the second surface 408.

Compared to situation 2 illustrated in FIG. 3, the process 400 of FIG. 4 may result in increased epoxy coverage a, e.g., due to epoxy-epoxy affinity between the bulk epoxy 414 and the precured epoxy 404 during application of the bulk epoxy 414. Accordingly, the resulting epoxy bond shear strength F may be increased due at least in part to the increased epoxy coverage a in FIG. 4 as compared to situation 2 in FIG. 3.

In some embodiments, the precured epoxy application process 400 disclosed with respect to FIG. 4 may be adapted for use with non-epoxy adhesives to address the problem illustrated in and described with respect to FIG. 3. For instance, a portion of non-epoxy adhesive analogous to the portion 404 in FIG. 4 may be dispensed on the first surface 406 and allowed to harden and/or cure. Afterward, the first surface 406 may be positioned in a desired orientation relative to the second surface 408 with the tunnel or gap 412 and bulk non-epoxy adhesive may be dispensed in the tunnel or gap 412, followed by the bulk non-epoxy adhesive hardening and/or curing.

Figures 5A, 5B, 5C:
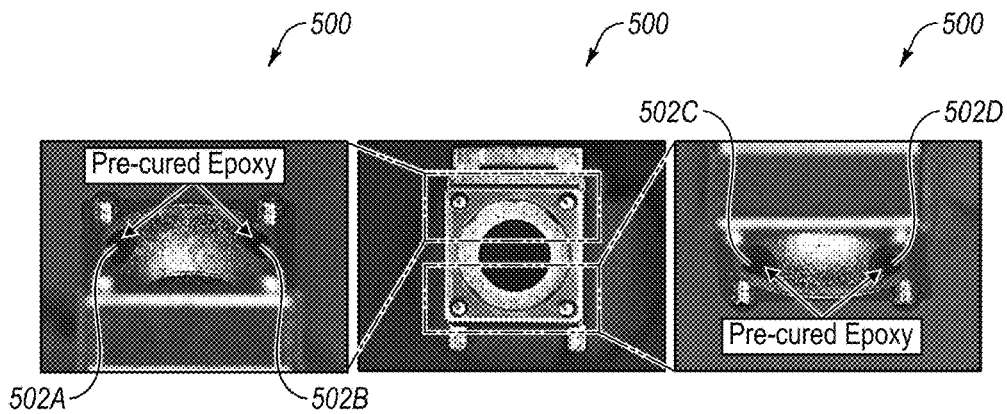
FIG. 5A illustrates an end view looking into a cylindrical cavity of an OSA block, precured epoxy being angularly spaced around a cylindrical inner wall surface of the OSA block.
FIG. 5B illustrates an underside perspective view of the OSA block of FIG. 5A in which precured epoxy portions are visible.
FIG. 5C illustrates an overhead perspective view of the OSA block of FIG. 5A in which additional precured epoxy portions are visible.

FIGS. 5A-5C include photographs of an example OSA block 500 with four precured epoxy portions 502A-502D (collectively "precured epoxy 502"), arranged in accordance with at least one embodiment described herein. FIG. 5A includes an end view looking into a cylindrical cavity of the OSA block 500, the precured epoxy 502 being angularly spaced around a cylindrical inner wall surface of the OSA block 500. FIG. 5B includes an underside perspective view of the OSA block 500 in which precured epoxy portions 502A and 502B are visible. FIG. 5C includes an overhead perspective view in which precured epoxy portions 502C and 502D are visible.

Figure 6:
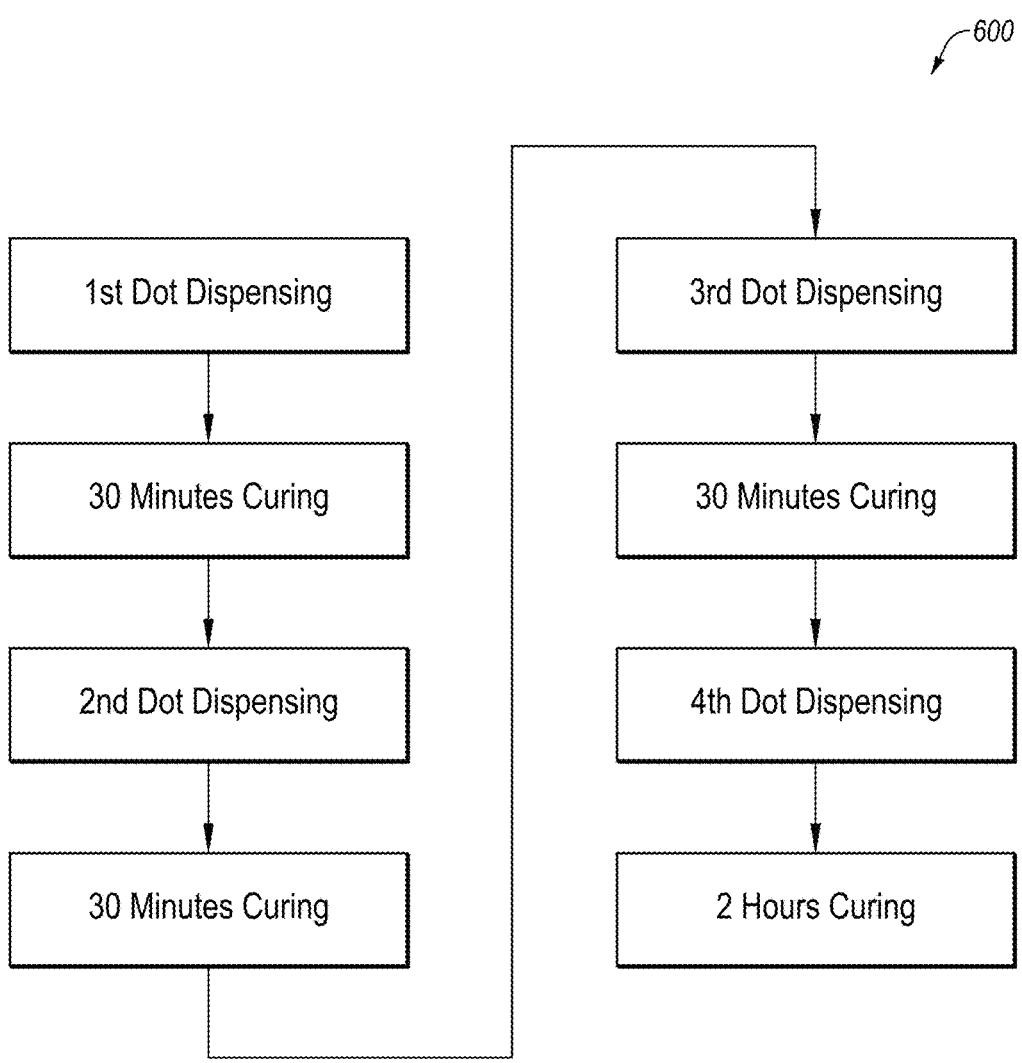
FIG. 6 illustrates a flowchart of an example process to dispense and cure multiple portions of epoxy.

FIG. 6 includes a flowchart of an example process 600 to dispense and cure multiple portions of epoxy, arranged in accordance with at least one embodiment described herein. The process 600 may be implemented to dispense and cure the precured epoxy 502 of FIGS. 5A-5C, for instance. The process 600 includes dispensing a first dot, drop, or portion of epoxy on a first surface, curing the first dot, drop, or portion of epoxy for 30 minutes, dispensing a second dot, drop, or portion of epoxy on the first surface, curing the second dot, drop, or portion of epoxy for 30 minutes, dispensing a third dot, drop, or portion of epoxy on the first surface, curing the third dot, drop, or portion of epoxy for 30 minutes, dispensing a fourth dot, drop, or portion of epoxy on the first surface, and curing the fourth dot, drop, or portion of epoxy for two hours.

More generally, for N>2, the process 600 may include successively dispensing N dots, drops, or portions of epoxy on the first surface; after dispensing each of the $1^{st}$ through N−1 dots, drops, or portions of epoxy, curing the dots, drops, or portions of epoxy dispensed to that point for at least a first predetermined amount of time (e.g., 30 minutes); and after dispensing the Nth dot, drop, or portion of epoxy, curing all N dots, drops, or portions of epoxy for a second predetermined amount of time (e.g., two hours) that is longer than the first predetermined amount of time.

The above examples of the process 600 describe each earlier dispensed dot, drop, or portion of epoxy as being further cured each time a subsequently dispensed dot, drop, or portion of epoxy is cured for the first time. Alternatively or additionally, one or more earlier dispensed dots, drops, or portions of epoxy may be cured only one or at least fewer than N times (for N dots, drops, or portions of epoxy) prior to being cured a last time with the bulk epoxy.

Some embodiments of precured epoxy application processes as described herein result in stronger epoxy bond shear strength F between two surfaces compared to the standard epoxy application process described herein, as experimentally confirmed by the instant inventors. In particular, 100 units (e.g., OSAs) each with an OSA block and OSA receptacle were assembled using the standard epoxy application process and another 100 units were assembled using the precured epoxy application process described with respect to FIGS. 4-6 and then the epoxy bond shear strength F and epoxy coverage a were measured for each of the 200 units. The results of this experiment are illustrated in FIGS. 7 and 8. Of the 100 units assembled using the standard epoxy application process, 25 of them had an epoxy coverage a less than or equal to 39% and an epoxy bond shear strength F less than 7 kgF and of these 25 units, 21 had an epoxy coverage a of 0%. In comparison, all of the 100 units assembled using the precured epoxy application process had epoxy coverage a of at least 40% and epoxy bond shear strength F of at least 7 kgF up to 35 kgF. As another point of comparison, 75 of the 100 units assembled using the precured epoxy application process had an epoxy coverage a of 100%, compared to only 52 of the 100 units assembled using the standard epoxy application process with an epoxy coverage a of 100%.

In connection with FIG. 7 and the associated description above, FIG. 8 is a table with the distribution, in terms of measured epoxy coverage a, of the 100 units assembled using the standard epoxy application process (see columns under "Standard Process") and of the 100 units assembled using the precured epoxy application process (see columns under "Pre-Cure Epoxy Process").

FIG. 9 illustrates a cross-sectional view 900 of an example OSA block 902 and OSA receptacle 904 assembled using the precured epoxy application process, arranged in accordance with at least one embodiment described herein. FIG. 9 additionally includes detail views of left and right regions of the cross-sectional view 900, respectively denoted by boxes 906A and 906B (hereinafter "left region 906A" and "right region 906B"). A portion of precured epoxy 908A, 908B is visible in each of the left region 906A and the right region 906B along with bulk epoxy 910 that fills a gap between the OSA block 902 and the OSA receptacle 904 around the precured epoxy 908A, 908B.

The results presented in FIGS. 7-9C demonstrate that epoxy coverage a is higher for the precured epoxy application process than for the standard epoxy application process (e.g., 100 units with at least 40% epoxy coverage a and 75 with 100% epoxy coverage a for the precured epoxy application process compared to only 75 with at least 40% epoxy coverage a and only 52 with 100% epoxy coverage a for the standard epoxy application process). The epoxy bond shear strength F increased significantly as the epoxy coverage a increased, from <7 kgF with as little as 0% epoxy coverage a for 21 of the 100 units assembled using the standard epoxy application process to 7-35 kgF with at least 40% epoxy coverage a for all 100 units assembled using the precured epoxy application process. Thus, the precured epoxy application process leads to a demonstrable increase in epoxy coverage a and epoxy bond shear strength F compared to the standard epoxy application process.

As described above, some embodiments described herein resolve variation in epoxy coverage a (that may vary down to 0% epoxy coverage for many units as described above) in the standard epoxy application process by promoting increased and adequate epoxy coverage to a designated area through the precured epoxy application process. The process of dispensing and curing several portions, dots or drops of epoxy (e.g., precured epoxy) has increased the epoxy wetting environment (epoxy-epoxy affinity) and thus increased the surface wetting and flow of epoxy to the designated area.

Some embodiments described herein resolve problems and limitations of variation in the standard epoxy application process that result in inconsistency in the epoxy coverage a for adequate epoxy bond shear strength F. When there is no epoxy coverage at the designated area (e.g., 0% epoxy coverage a), the epoxy bond shear strength F is very low (~1 kgF). Some embodiments described herein using the precured epoxy application process may have the assurance that there will be adequate epoxy coverage a to the designated area. This has been proven with epoxy coverage inspection and epoxy shear strength check using a push test method, as described with respect to FIGS. 7-9C. All 100 evaluation units assembled using the precured epoxy application process have demonstrated >7 kgF (max ~35 kgF) pre and post reliability stress. The minimum epoxy coverage a for the precured epoxy application process may be ~40% (as compare to 0% for the standard epoxy application process).

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The invention claimed is:

1. A method to bond a first surface to a second surface, the method comprising:
dispensing a portion of epoxy on the first surface;
curing the portion of epoxy to form precured epoxy;
positioning the first surface and the second surface separated from each other by a gap, wherein the precured epoxy is located within the gap between the first surface and the second surface;
dispensing bulk epoxy into the gap and in contact with the precured epoxy, the first surface, and the second surface; and
curing the bulk epoxy to bond the first surface to the second surface.

2. The method of claim 1, wherein:
the portion of epoxy comprise a first portion of epoxy;
the precured epoxy comprises a first precured epoxy;
curing the portion of epoxy to form the precured epoxy comprises curing the first portion of epoxy for a first predetermined amount of time to form the first precured epoxy; and
the method further comprises:
after curing the first portion of epoxy and before dispensing the bulk epoxy, dispensing a second portion of epoxy on the first surface at a different location than the first portion of epoxy; and
curing the second portion of epoxy for the first predetermined amount of time to form a second precured epoxy.

3. The method of claim 2, further comprising:
after curing the second portion of epoxy and before dispensing the bulk epoxy, dispensing a third portion of epoxy on the first surface at a different location than the first portion of epoxy and the second portion of epoxy;
curing the third portion of epoxy for the first predetermined amount of time to form a third precured epoxy;
after curing the third portion of epoxy and before dispensing the bulk epoxy, dispensing a fourth portion of epoxy on the first surface at a different location than the first portion of epoxy, the second portion of epoxy, and the third portion of epoxy; and
curing the fourth portion of epoxy for a second predetermined amount of time to form a fourth precured epoxy.

4. The method of claim 3, wherein the second predetermined amount of time is longer than the first predetermined amount of time.

5. The method of claim 4, wherein the first predetermined amount of time is 30 minutes and the second predetermined amount of time is 2 hours.

6. The method of claim 3, wherein the first surface includes an inner cylindrical wall surface of an optical subassembly (OSA) block, and wherein the first portion of epoxy, the second portion of epoxy, the third portion of epoxy, and the fourth portion of epoxy are angularly spaced around on the inner cylindrical wall surface of the OSA block.

7. The method of claim 1, wherein:
the first surface includes an inner cylindrical wall surface of an optical subassembly (OSA) block;
the inner cylindrical wall surface of the OSA block defines a cylindrical cavity;
the second surface includes an outer cylindrical wall surface of an OSA receptacle; and
positioning the first surface and the second surface separated from each other by the gap includes positioning the outer cylindrical wall surface of the OSA receptacle at least partially inside the cylindrical cavity and separated from the inner cylindrical wall surface of the OSA block by a cylindrical gap.

8. The method of claim 7, wherein an epoxy bond shear strength between the OSA block and the OSA receptacle is at least 7 kgF.

9. The method of claim 7, wherein dispensing the bulk epoxy into the gap and in contact with the precured epoxy, the first surface, and the second surface includes dispensing the bulk epoxy into the cylindrical gap with an epoxy coverage of at least 40%.

10. An optical subassembly (OSA), comprising:
a first surface;
a second surface separated from the first surface by a gap;
precured epoxy on the first surface and located within the gap; and
bulk epoxy in the gap and in contact with the precured epoxy, the first surface, and the second surface, the bulk epoxy bonding the first surface and the second surface together,
wherein:
the precured epoxy is formed by dispensing and curing a portion of epoxy on the first surface before the bulk epoxy is dispensed into the gap and cured; and
the precured epoxy is separated from the second surface by the gap.

11. The OSA of claim 10, wherein the portion of epoxy comprise a first portion of epoxy and a second portion of epoxy such that the precured epoxy includes a first precured epoxy and a second precured epoxy, wherein the first portion of epoxy is dispensed and cured on the first surface to form the first precured epoxy before the second portion of epoxy is dispensed and cured on the first surface to form the second precured epoxy.

12. The OSA of claim 11, wherein the portion of epoxy further comprises a third portion of epoxy and a fourth portion of epoxy such that the precured epoxy further includes a third precured epoxy and a fourth precured epoxy, wherein the third portion of epoxy is dispensed and cured on the first surface to form the third precured epoxy after the second portion of epoxy is dispensed and on the first surface to form the second precured epoxy, wherein the fourth portion of epoxy is dispensed and cured on the first surface to form the fourth precured epoxy after the third portion of epoxy is dispensed and cured on the first surface to form the third precured epoxy.

13. The OSA of claim 12, wherein the first surface includes an inner cylindrical wall surface of an OSA block, wherein the first precured epoxy, the second precured epoxy, the third precured epoxy, and the fourth precured epoxy are angularly spaced around the inner cylindrical wall surface.

14. The OSA of claim 12, wherein the first portion of epoxy, the second portion of epoxy, and the third portion of epoxy is each precured for a first predetermined amount of time and the fourth portion of epoxy is precured for a second predetermined amount of time.

15. The OSA of claim 14, wherein the second predetermined amount of time is longer than the first predetermined amount of time.

16. The OSA of claim 15, wherein the first predetermined amount of time is 30 minutes and the second predetermined amount of time is 2 hours.

17. The OSA of claim 10, wherein the first surface includes an inner cylindrical wall surface of an OSA block, the inner cylindrical wall surface of the OSA block defines a cylindrical cavity, and the second surface includes an outer cylindrical wall surface of an OSA receptacle, and wherein the outer cylindrical wall surface of the OSA receptacle is positioned at least partially inside the cylindrical cavity and separated from the inner cylindrical wall surface of the OSA block by a cylindrical gap.

18. The OSA of claim 17, wherein an epoxy bond shear strength between the OSA block and the OSA receptacle is at least 7 kgF and an epoxy coverage of the bulk epoxy in the cylindrical gap is at least 40%.

19. A method to bond a first surface of an optical subassembly (OSA) block to a second surface of an OSA receptacle, the method comprising:

dispensing a first portion of epoxy on the first surface;
curing the first portion of epoxy to form first precured epoxy;
dispensing a second portion of epoxy on the first surface;
curing the second portion of epoxy to form second precured epoxy;
dispensing a third portion of epoxy on the first surface;
curing the third portion of epoxy to form third precured epoxy;
dispensing a fourth portion of epoxy on the first surface;
curing the fourth portion of epoxy to form fourth precured epoxy;
positioning the first surface and the second surface separated from each other by a gap, wherein the first precured epoxy, the second precured epoxy, the third precured epoxy, and the fourth precured epoxy are located within the gap between the first surface and the second surface;
dispensing bulk epoxy into the gap and in contact with the first precured epoxy, the second precured epoxy, the third precured epoxy, the fourth precured epoxy, the first surface, and the second surface; and
curing the bulk epoxy to bond the first surface to the second surface.

* * * * *